United States Patent
Noack et al.

(10) Patent No.: US 12,005,843 B2
(45) Date of Patent: Jun. 11, 2024

(54) DECORATIVE STRIP ASSEMBLY FOR A MOTOR VEHICLE DOOR

(71) Applicant: Bayerische Motoren Werke Aktiengesellschaft, Munich (DE)

(72) Inventors: Nadine Noack, Munich (DE); Joerg Pieroth, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 320 days.

(21) Appl. No.: 17/630,392

(22) PCT Filed: Jul. 2, 2020

(86) PCT No.: PCT/EP2020/068663
§ 371 (c)(1),
(2) Date: Jan. 26, 2022

(87) PCT Pub. No.: WO2021/018508
PCT Pub. Date: Feb. 4, 2021

(65) Prior Publication Data
US 2022/0281392 A1    Sep. 8, 2022

(30) Foreign Application Priority Data

Jul. 30, 2019   (DE) ..................... 10 2019 120 520.4

(51) Int. Cl.
*B60R 13/04*       (2006.01)
*B32B 25/08*       (2006.01)

(52) U.S. Cl.
CPC .............. *B60R 13/04* (2013.01); *B32B 25/08* (2013.01); *B32B 2451/00* (2013.01); *B32B 2605/08* (2013.01)

(58) Field of Classification Search
CPC ........... B60R 13/04; B60R 1/06; B60R 13/06; B32B 25/08; B32B 2451/00; B32B 2605/08
(Continued)

(56) References Cited

U.S. PATENT DOCUMENTS 7,052,021 B2    5/2006   Plottnik

FOREIGN PATENT DOCUMENTS

| CN | 1429156 A | 7/2003 |
| CN | 204432563 U | 7/2015 |

(Continued)

OTHER PUBLICATIONS

English-language Chinese Office Action issued in Chinese application No. 202080052165.7 dated May 22, 2023 (Seven (7) pages).

(Continued)

*Primary Examiner* — Joseph D. Pape
(74) *Attorney, Agent, or Firm* — Crowell & Moring LLP

(57) ABSTRACT

A trim strip arrangement for a motor vehicle door includes a first trim strip disposable below a mirror triangle of the motor vehicle door, a second trim strip which adjoins the first trim strip in a flush manner, a retention device, where an assembly of the first trim strip and the second trim strip is mountable on the motor vehicle door by the retention device, and a connection device which orientates the first trim strip and the second trim strip relative to each other. The connection device is in a form of a connection component which is formed integrally on the retention device.

10 Claims, 2 Drawing Sheets

(58) Field of Classification Search
USPC .......................................................... 296/1.08
See application file for complete search history.

(56) References Cited

FOREIGN PATENT DOCUMENTS

| | | |
|---|---|---|
| DE | 10 2009 017 384 A1 | 10/2010 |
| DE | 10 2017 011 400 A1 | 7/2018 |
| EP | 3 279 020 A1 | 2/2018 |
| EP | 3470272 A1 * | 4/2019 ............. B60R 11/04 |
| JP | 2013-154747 A | 8/2013 |
| WO | WO 2016/205799 A1 | 12/2016 |

OTHER PUBLICATIONS

PCT/EP2020/068663, International Search Report dated Aug. 28, 2020 (Two (2) pages).
German Search Report issued in German application No. 10 2019 120 520.4 dated May 26, 2020, with Statement of Relevancy (Eight (8) pages).

* cited by examiner

DECORATIVE STRIP ASSEMBLY FOR A MOTOR VEHICLE DOOR

BACKGROUND AND SUMMARY OF THE INVENTION

The invention relates to a trim strip arrangement for a motor vehicle door.

In a known trim strip arrangement which has a first trim strip which is arranged below a mirror triangle of the motor vehicle door and a second trim strip which adjoins the first trim strip in a flush manner, there is provided a retention device by means of which the two trim strips are orientated with respect to each other. Both are mounted on a flange of the motor vehicle door.

In order to prevent an offset of the trim strips relative to each other, a positive-locking connection is provided. This connection is produced by means of a stamped sheet metal component which constitutes a separate component and on which both trim strips are placed. In order to integrate this arrangement in the motor vehicle door, additional milling operations on the first trim strip below the mirror triangle and a more complex shaping cut on the second trim strip are necessary.

Therefore, an object of the present invention is to provide a trim strip arrangement which enables a reduction of the number of components and a simplification of the assembly.

In detail, according to the invention there is provided a trim strip arrangement for a motor vehicle door which is in particular a frameless motor vehicle door, wherein the trim strip arrangement has two trim strips which are separate from each other so that an adjustability of the door pane can be achieved by means of a window shaft.

The trim strip arrangement according to the invention has, in addition to the first trim strip which is mounted below the mirror triangle, a second trim strip which adjoins the first trim strip in a flush manner and which preferably extends over the entire window shaft.

The trim strip arrangement according to the invention further has a retention device, by means of which the first trim strip can be preassembled on the motor vehicle door.

There is further provided a connection device which orientates the two strips relative to each other.

In particular in order to save components, there is provision according to the invention for the connection device to be in the form of a connection component which is formed integrally on the retention device, which affords the advantage that no additional component, such as the stamped sheet metal component of the known trim strip arrangement, is required.

This affords the additional advantages that with respect to the known arrangement only an assembly operation is required, that the number of required milling operations can be reduced and that a very advantageous appearance is produced, wherein the risk of formation of a gap is significantly reduced, if not completely excluded.

Since the provision of a stamped sheet metal component as a connection device can be prevented, the advantage is further afforded that no corrosion problems occur.

Furthermore, the trim strip arrangement according to the invention affords the advantage that it is not possible to tear out the trim strips and that both the production and the assembly costs can be reduced since no additional component is required as a retention device and fewer process steps are required for the production of the trim strip arrangement according to the invention.

Finally, the advantage is afforded of fewer tolerances susceptible to problems since it is possible to use a specifically shaped tool for the production.

The dependent claims relate to advantageous developments of the invention.

Preferably the retention device is constructed as a two-component element which has a hard component, in particular made of resin plastics material, and a soft component, in particular made of rubber.

With such a two-component element, it is possible for the connection component to be constructed as an extension of the hard component on which, after assembly of the first trim strip, the second trim strip can be placed. In this instance, the first trim strip is initially fixed to the retention device, in particular clip-fitted, and this assembly comprising the retention device and a first trim strip is fixed to the motor vehicle door, in particular to the vehicle flange. On this preassembled component unit, the second trim strip can then be placed on the extension or the extension component.

In order to simplify the assembly of the second trim strip, it is possible to provide the connection component with chamfered assembly members.

In order to fix the retention device to the motor vehicle door, the retention device has a receiving opening which may extend over the entire length of the retention device and which can be placed on a flange of the motor vehicle door.

A motor vehicle door according to the invention is defined as an object which can be handled independently.

Other details, features and advantages of the invention will be appreciated from the following description of an embodiment with reference to the drawings.

DETAILED DESCRIPTION OF THE DRAWINGS

Figure 1:
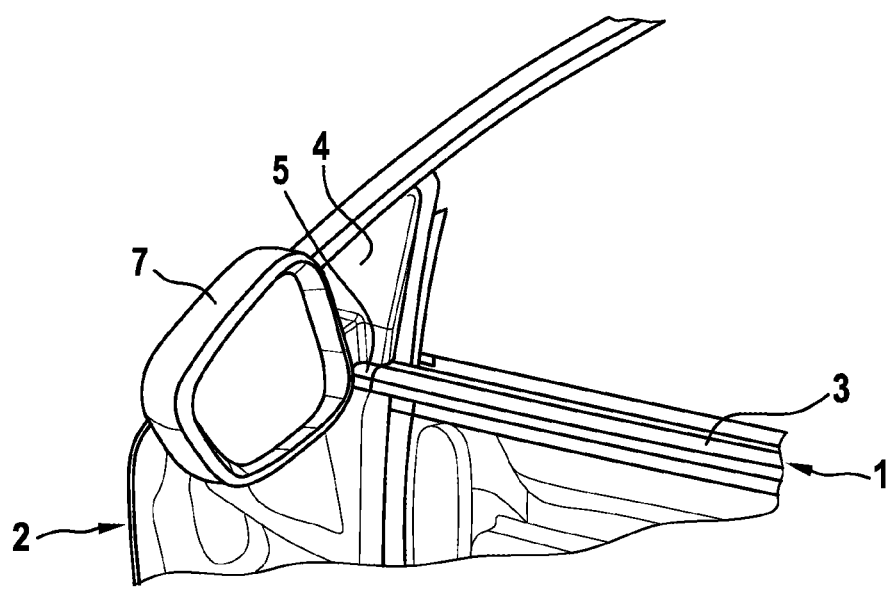
FIG. 1 is a schematic, slightly simplified perspective partial view of a motor vehicle door according to the invention.

FIG. 1 is a perspective, slightly simplified partial illustration of a motor vehicle door 2 according to the invention which is provided with a rear-view mirror 7 which is secured to a mirror triangle 4. Furthermore, the motor vehicle door 2 has a trim strip arrangement 1 which has a first trim strip 3 which is arranged below the mirror triangle 4 and which has a second trim strip 5 which adjoins the first trim strip 3 in a flush manner.

Figure 2:
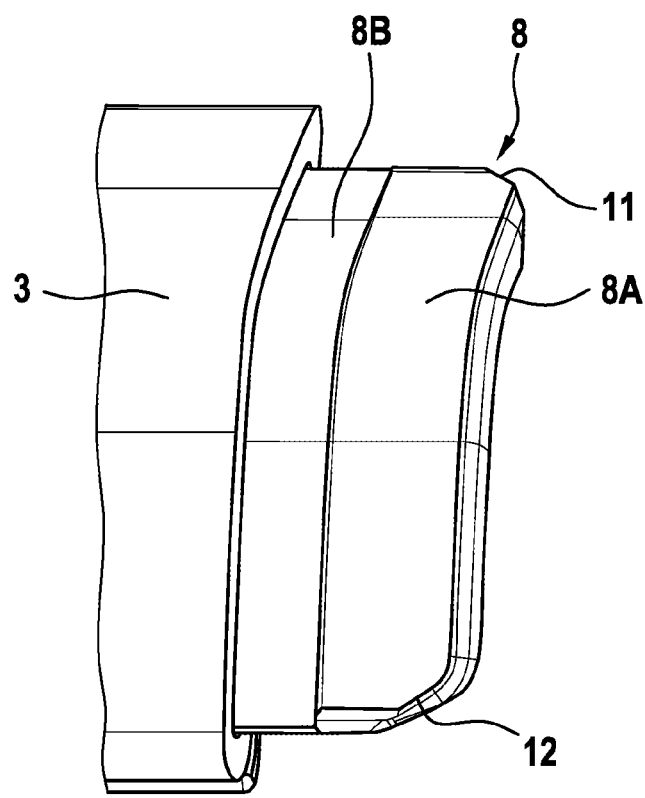
FIG. 2 is a perspective partial view of an attachment region of a connection component of the retention device.
Figure 3:
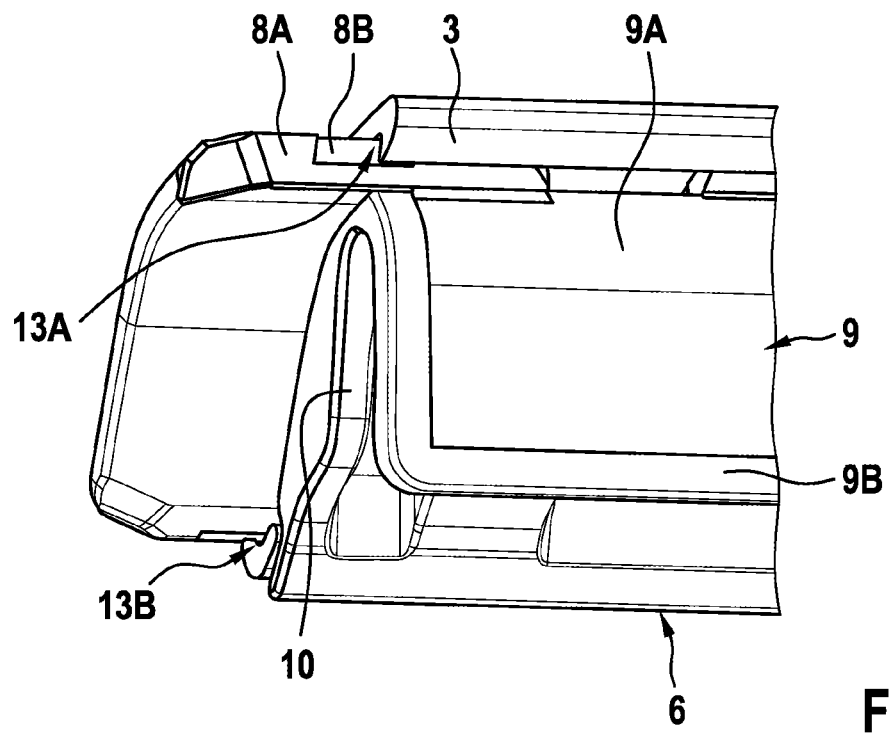
FIG. 3 is a perspective rear view of the retention device.
Figure 4:
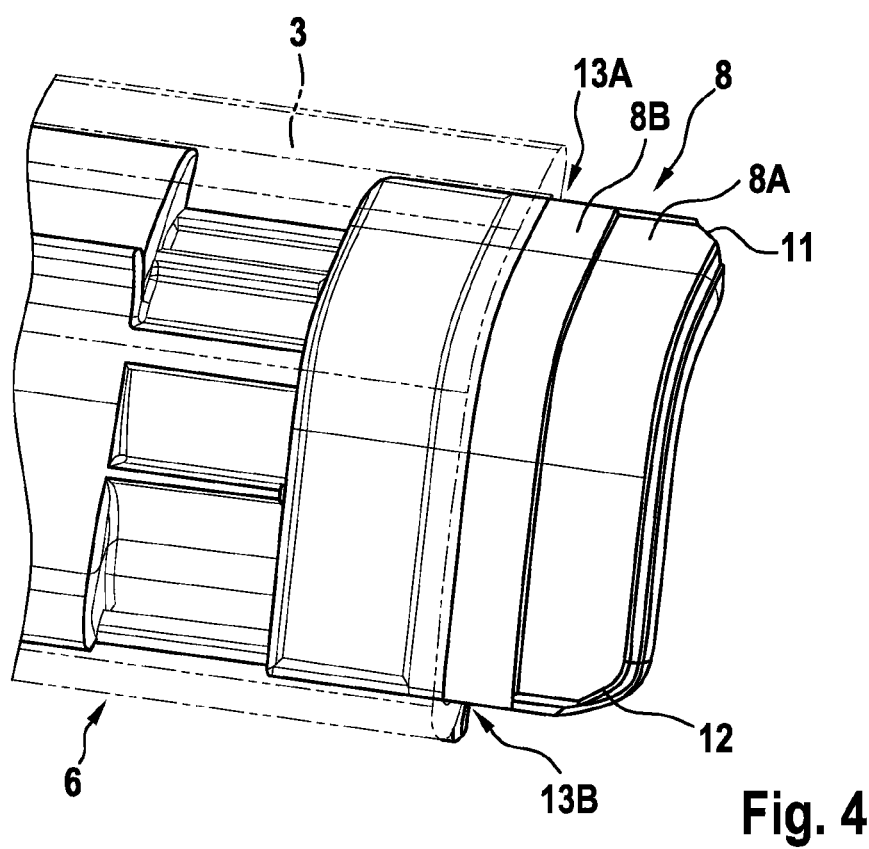
FIG. 4 is another plan view, which corresponds to FIG. 2, of a portion of the retention device with the connection component thereof.

As can be seen from an overview of FIGS. 2 to 4, for assembly of the first trim strip 2 there is provided on the motor vehicle door 2 a retention device 6 which is provided in order to avoid additional components with a connection component 8 which is formed integrally on the retention device 6.

As the overview of FIGS. 2 to 4 further shows, the retention device 6, in the embodiment which is particularly preferred in these Figures, as a two-component element 9 which has a hard component 9A and a soft component 9B. In this instance, the connection component 8 is an extension 8A of the hard component 9A to which the first trim strip which cannot be seen in FIGS. 2 to 4 can be attached. In order to facilitate assembly, the extension 8A is provided with chamfered assembly members 11 and 12.

As can be seen in particular in FIG. 3, a soft component region 8B of the soft component 9B which in particular comprises rubber is arranged in attachment regions 13A and 13B of the first trim strip 3 in order to facilitate the fitting of the second trim strip 5.

In this instance, FIGS. 2 to 4 explain that, as a result of the fact that the connection component 8 is formed integrally on the retention device 6 and is preferably provided as an extension 8A of the hard component 9A, the retention device 6 and the connection device 8 form a component on which the first trim strip 3 can initially be fitted and via which the entire trim strip arrangement 1 can be mounted by means of a receiving opening 10 on a flange of the motor vehicle door 2.

This results in the reduction of the components explained in the introduction, the reduction of the process steps and the simplification of the assembly of the trim strip arrangement 1 according to the invention.

In addition to the above written disclosure, in order to supplement the disclosure of the present invention, reference is explicitly hereby made to the drawings of the invention in FIGS. 1 to 4.

LIST OF REFERENCE CHARACTERS

1 Trim strip arrangement
2 Motor vehicle door
3 First trim strip
4 Mirror triangle
5 Second trim strip
6 Retention device
7 Rear-view mirror
8 Connection component
8A Extension of a hard component 9A of a two-component element 9
8B Soft component region of a soft component 9B of the two-component element 9
9 Two-component portion
10 Receiving opening
11, 12 Chamfered assembly members
13A, 13B Clip-fit regions or attachment regions

What is claimed is:

1. A trim strip arrangement for a motor vehicle door, comprising:
   a first trim strip disposable below a mirror triangle of the motor vehicle door;
   a second trim strip which adjoins the first trim strip in a flush manner;
   a retention device, wherein an assembly of the first trim strip and the second trim strip is mountable on the motor vehicle door by the retention device; and
   a connection device which orientates the first trim strip and the second trim strip relative to each other;
   wherein the connection device is in a form of a connection component which is formed integrally on the retention device.

2. The trim strip arrangement according to claim 1, wherein the retention device is constructed as a two-component element which has a hard component and a soft component.

3. The trim strip arrangement according to claim 2, wherein the connection component is constructed as an extension of the hard component.

4. The trim strip arrangement according to claim 3, wherein the extension has chamfered assembly members.

5. The trim strip arrangement according to claim 2, wherein the hard component is a hard plastics material and wherein the soft component is rubber.

6. The trim strip arrangement according to claim 2, wherein a soft component portion of the soft component is disposed in clip-fit regions or attachment regions of the first trim strip.

7. The trim strip arrangement according to claim 1, wherein the retention device has a receiving opening.

8. The trim strip arrangement according to claim 1, wherein the second trim strip is attached to the connection device and wherein the first trim strip is clip-fitted to the retention device.

9. A motor vehicle door, comprising:
   a trim strip arrangement which includes:
      a first trim strip disposed below a mirror triangle of the motor vehicle door;
      a second trim strip which adjoins the first trim strip in a flush manner;
      a retention device, wherein an assembly of the first trim strip and the second trim strip is mounted on the motor vehicle door by the retention device; and
      a connection device which orientates the first trim strip and the second trim strip relative to each other;
      wherein the connection device is in a form of a connection component which is formed integrally on the retention device.

10. The motor vehicle door according to claim 9, wherein the retention device is constructed as a two-component element which has a hard component and a soft component.

* * * * *